Aug. 6, 1946.  S. K. LEHMAN ET AL  2,405,362
DE-ICER UNLOADING VALVE
Filed Aug. 11, 1943  3 Sheets-Sheet 2

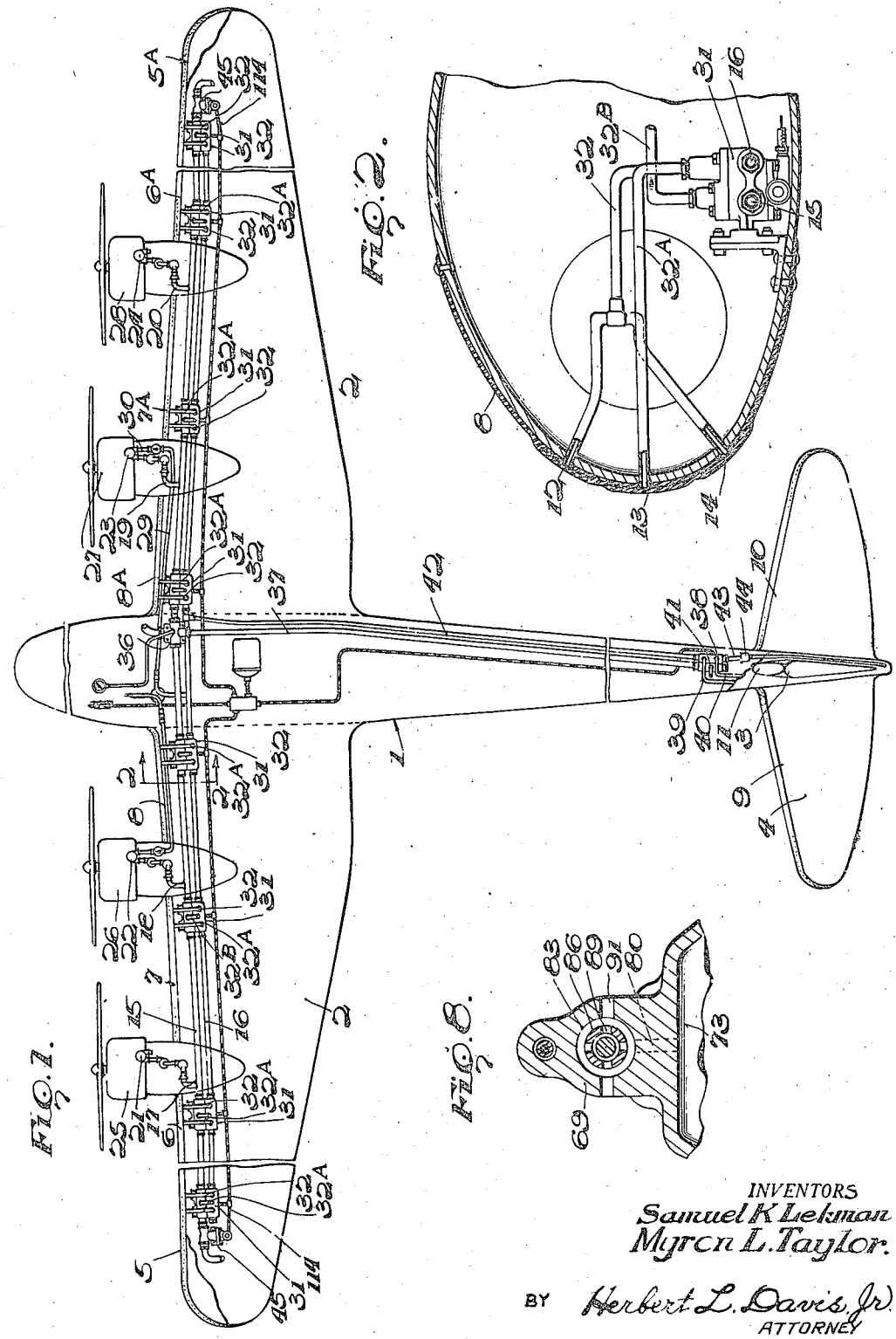

INVENTORS
Samuel K Lehman
Myron L. Taylor
BY Herbert L. Davis, Jr.
ATTORNEY

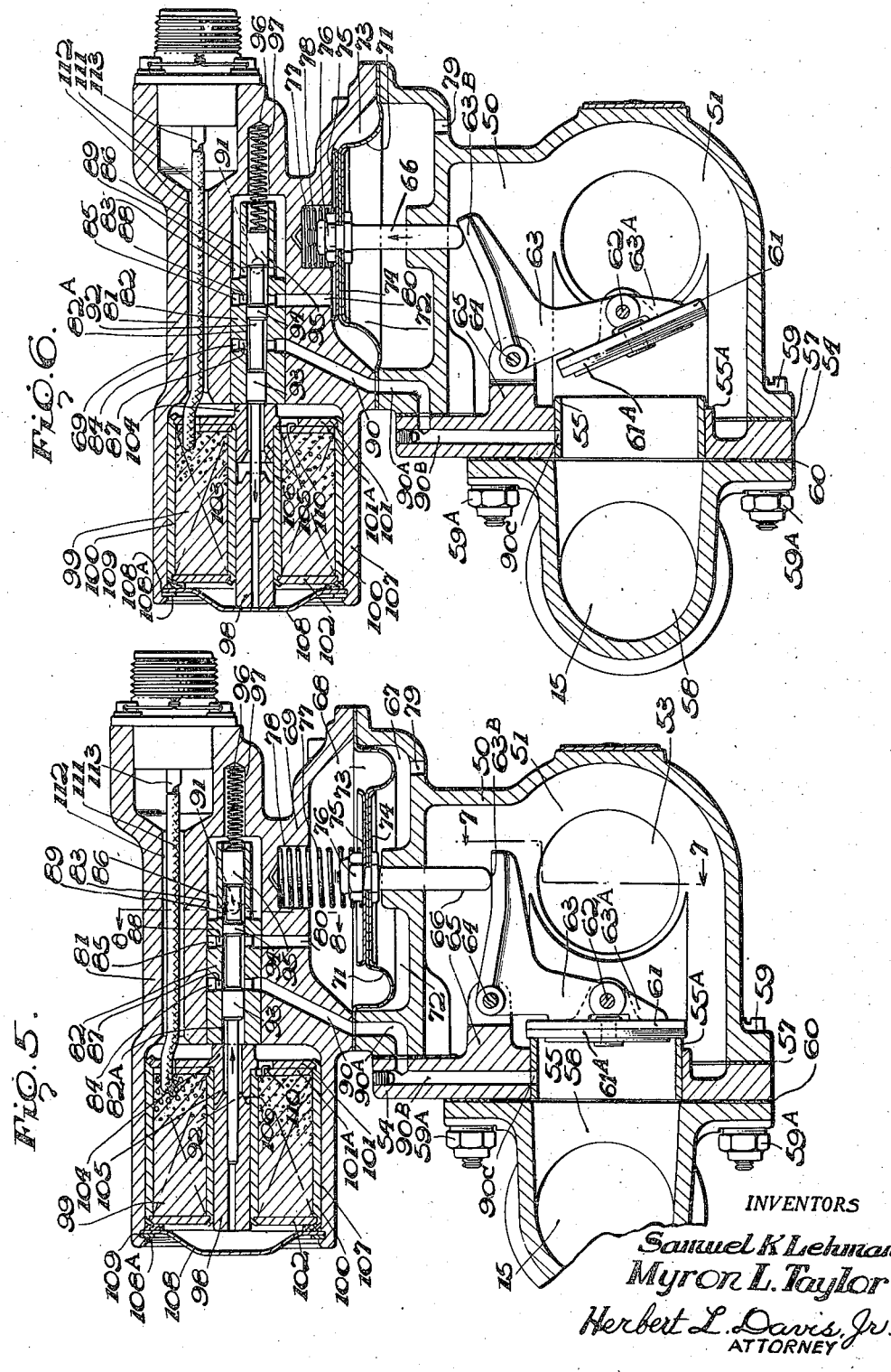

Patented Aug. 6, 1946

2,405,362

UNITED STATES PATENT OFFICE 2,405,362

DEICER UNLOADING VALVE

Samuel K. Lehman, Brooklyn, N. Y., and Myron L. Taylor, Ridgewood, N. J., assignors to Bendix Aviation Corporation, Teterboro, N. J., a corporation of Delaware Application August 11, 1943, Serial No. 498,249

7 Claims. (Cl. 244—134)

Our present invention relates to pressure medium controls, valves and systems and more particularly to valve structures and systems for use in aircraft de-icer controls.

In aircraft de-icer systems, several arrangements of distributing valves and air pressure utilization for flexible boot members have been shown and described in the prior art. Many of these systems have utilized large amounts of complicated air conduit supplied with air from a central motor-driven distributor valve for the distribution of air under pressure to the boot elements so as to break up and eliminate ice forming over the leading edges of wings and tail surfaces.

Heretofore it has also been proposed to utilize a single pressure conduit for supplying air to the several boot elements.

In the latter system the air is placed under pressure through means of pressure pumps driven by the aircraft motors. In such prior systems, however, when conditions are such as not to require the use of the de-icers the pressure built up in the conduit tends to create a back pressure which places an unnecessary and undesirable load on the pressure pumps and the aircraft motor.

Therefore, in order to eliminate such back pressure, it is an object of our invention to provide a simplified and improved de-icer air distribution system comprising a single pressure conduit and means for unloading the pressure from this conduit when the de-icer is not in use.

Another object of our invention is to provide a simple and efficient unloading system for such a single pressure conduit operated de-icer system.

Another object of our invention is to provide a novel unloading valve for a pressure conduit having means operated by the pressure within the conduit for holding the unloading valve closed.

Another object of our invention is to provide simple control means for releasing the aforesaid holding pressure so that said unloading valve may be opened under the biasing force of the pressure within the said pressure conduit.

Another object of our invention is to provide a novel control valve for a pressure conduit having means operated by the pressure within the conduit for closing the valve against the biasing force of such pressure.

A further object of our invention is to provide a compact unloading valve small in size and of such simplicity in construction as to adapt it for manufacture and installation at low cost.

Other objects and advantages of this invention are set forth in the following description, taken with the accompanying drawings; and the novel features thereof are pointed out in the appended claims. The disclosure, however, is illustrative only and changes may be made in detail, especially in matters of shape, size and arrangement of parts within the principle of the invention to the full extent indicated by the meanings of the terms in which the appended claims are expressed.

In the accompanying drawings which form a part of this specification like characters of reference indicate like parts in the several views wherein:

Figure 1 is a diagrammatic top plan view of an aircraft with certain portions broken away so as to better show our novel unloading system for a pressure operated de-icer and illustrating an application of our novel control valve.

Figure 2 is an enlarged fragmentary cross sectional view of Figure 1 taken along the lines 2—2 and looking in the direction of the arrows.

Figure 5 is a longitudinal sectional view of Figure 3 taken along the lines 5—5 looking in the direction of the arrows and showing the control valve in a closed position.

Figure 6 is a longitudinal sectional view similar to Figure 5 showing the control valve in an open position.

Figure 8 is a fragmentary cross-sectional view taken along the lines 8—8 of Figure 5 and looking in the direction of the arrows.

Figure 3:
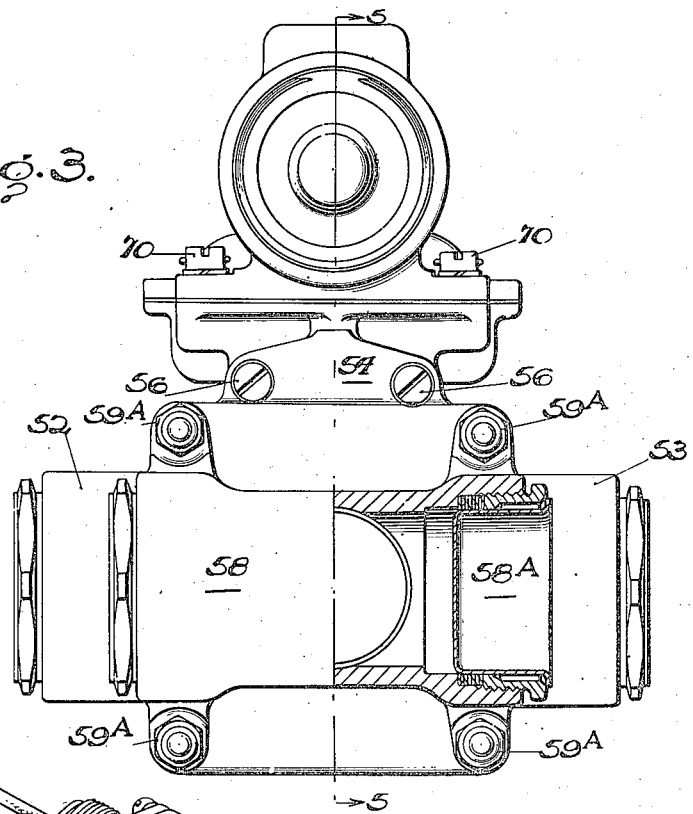
Figure 3 is an end view of my control valve with certain parts broken away.

Referring first to Figure 1, the invention is illustrated as applied to an airplane comprising a fuselage 1 and having wings 2 and vertical and horizontal stabilizers 3 and 4, respectively.

A plurality of inflatable units are mounted at the leading edge of the forward wings 2. These inflatable units are indicated on the port wing by the numerals 5, 6, 7 and 8, while on the starboard wing corresponding inflatable units are indicated by numerals 5A, 6A, 7A and 8A. Inflatable units are further provided at the leading edge of the horizontal stabilizers indicated at the port side by the numeral 9 and at the starboard side by the numeral 10. A further inflatable unit 11 is provided at the leading edge of the vertical stabilizer as shown in Figure 1.

The said inflatable units are constructed of elastic rubber-like material suitably reinforced and secured upon the wing or other airfoil and each unit comprises one or more inflatable tubes. In the illustrated embodiment each unit comprises three tubes for inflation, indicated in Figure 2 by the numerals 12, 13, and 14. The tubes 12 and 14 are arranged for inflation and deflation together while the tube 13 is separately inflatable from the tubes 12 and 14 as will be explained.

Extending spanwise of the wing 2 are main air pressure and suction conduits indicated by numerals 15 and 16, respectively. The air pressure conduit 15 is connected by conduits 17, 18, 19, and 20 to suitable air pressure pumps 21, 22, 23, and 24 driven by the airplane motors 25, 26, 27, and 28, respectively. The suction conduit 16 is connected by a conduit 29 to a suction inlet conduit 30 driven by the motor 27.

There are further provided separate distributor valve units 31 for controlling the inflation and deflation of the aforesaid inflatable units, through conduits 32 and 32A. The exhaust pressure from the inflatable tubes 12, 13, and 14 is conducted outward through an exhaust or overboard conduit 32B during deflation of the tubes. The said distributor valve units 31 are connected directly into the main pressure and suction conduits 15 and 16, respectively and are preferably of the type described in the copending application of Donald M. Lawrence, David Gregg, and Myron L. Taylor, Serial No. 498,248, filed August 11, 1943, and owned by the assignee of the present application.

A suitable relief valve 36 is mounted intermediate the opposite ends of the spanwise extending pressure conduit 15 for relieving the pressure within the conduit 15 upon the same increasing beyond a predetermined maximum value.

There is connected at the relief valve 36 a second pressure line 37 which extends longitudinally of the plane to a distributor valve 38 positioned at the rear of the plane and of like construction to the distributor valves 31.

The distributor valve 38 is arranged for controlling through the conduits 39 and 40 the inflation and deflation of the inflatable units 9, 10, and 11. Exhaust pressure during deflation is conveyed outward through conduit 41.

A suction line 42 connects the said distributor valve 38 to the main suction line 16. A second suction line 43 extends from the distributor valve 38 to a low pressure area of the plane. A suitable check valve 44 permits the line 43 to open upon a decrease in the suction force exerted through the line 42 below a predetermiend minimum value so as to exert in such event an added suction force to the line 42. Provided at the opposite ends of the spanwise extending conduits 15 and 16 are manifold unloading valves 45 which are arranged for releasing the pressure within the conduit 15 so as to eliminate at such times as the de-icer system is not in use back pressure from acting upon the pressure pumps 21, 22, 23, and 24.

The manifold unloading valves 45 are identical in construction and therefore only one will be described. Referring now to Figures 3 through 8 the manifold unloading valve 45 includes a casting 50 open at one side and having formed therein a chamber 51. Formed in the casting 50 and leading out of the chamber 51 are outlet conduits 52 and 53. The open side of the casting 50 is closed in part by a plate 54. The plate 54 has mounted therein an annular sleeve 55 open at the opposite ends and projecting through the plate 54 into the chamber 51 so as to form a valve seat 55A at the inner end thereof. The plate 54 is secured to the casting 50 by screws 56 and has provided a suitable sealing gasket 57 positioned between the plate 54 and the casting 50.

Figure 4:
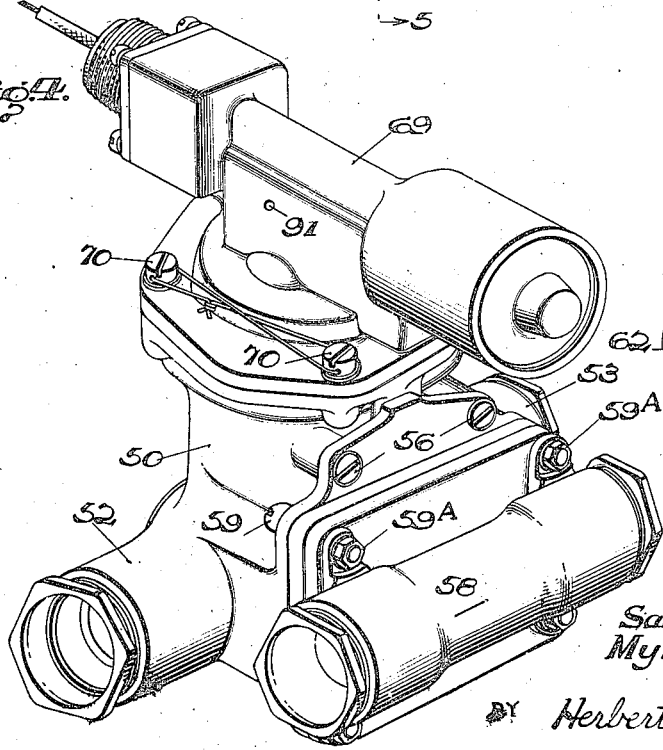
Figure 4 is a perspective view of Figure 3.
Figure 7:
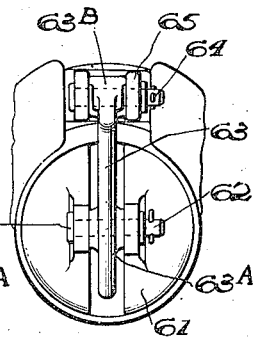
Figure 7 is a fragmentary view taken along the lines 7—7 of Figure 5, and looking in the direction of the arrows.

A conduit 58 leading into the outer open end of the sleeve 55 and connected to the main pressure conduit 15 as shown in Figures 5 and 6 is secured to the plate 54 and casting 50 by bolts 59 suitably fastened by nuts 59A. A suitable sealing gasket 60 is positioned between the conduit 58 and the plate 54. The conduit 58 as shown in Figures 3 and 4 is of a double end type for convenience in mounting in the pressure conduit 15. If an end is unused it may conveniently be closed by an end plug 58A screw threadedly engaged therein as shown in Figure 3.

A valve member 61 for controlling the opening at the inner end of the sleeve 55 is connected by a pin 62 to an end 63A of a bell crank lever 63. The bell crank lever 63 is pivotally mounted at a point intermediate the opposite ends by a pin 64 carried by an arm 65. The arm 65 is mounted on the plate 54 and projects into the chamber 51.

The valve member 61 carries a suitable sealing member 61A of rubber-like material and is arranged to rock slightly on the pin 62 to assure the proper seating of the sealing member 61A on the valve seat portion 55A in sealing relation thereto. An end 63B of the bell crank lever 63 is operably engaged by an actuating pin 66.

Formed in the opposite side of the casting 50 from the chamber 51 is an annular recess 67 positioned in opposite relation to a second annular recess 68 formed in a casting 69. The casting 69 is mounted on the casting 50 by the fastening bolts 70 as shown in Figures 3 and 4.

Positioned between casting 50 and the casting 69 is a diaphragm 71 best shown in Figures 5 and 6 which extends across the oppositely disposed annular recesses 67 and 68 and separates the same so as to form therein chambers 72 and 73, respectively.

The actuating pin 66 extends through a suitable aperture formed in the casting 50 into engaging relation with the diaphragm 71.

Plates 74 and 75 are clamped at the opposite sides of the diaphragm 71 and fastened to the actuating pin 66 by a nut 76 screw threadedly engaged at one end of the actuating pin 66.

A helical expansion spring 77 is positioned at one end in a recess 78 formed in the wall surface of the annular recess 68, while the opposite end of the spring 77 bears upon the plate 75 so as to bias the actuating pin 66 into engaging relation with the end 63B of the bell crank lever 63.

The chamber 72 formed by the annular recess 67 and the diaphragm 71 is opened to atmospheric pressure through a vent 79 formed in the casting 50 and leading into the chamber 72. The oppositely disposed chamber 73 formed by the annular recess 68 and the diaphragm 71 is subjected through a duct 80 formed in the casting 69, to a pressure medium controlled by a control valve indicated generally by the numeral 81.

The control valve 81 includes a valve sleeve 82 fixedly positioned in a channel 83 formed in the casting 69. The valve sleeve 82 has formed therein in spaced relation to each other annular recesses 84, 85, and 86.

A valve channel 82A extends longitudinally through the valve sleeve 82 and suitable ports 87, 88, and 89 lead from the annular recesses 84, 85, and 86, respectively, into the channel 82A.

The duct 80 previously noted leads into the annular recess 85 while a duct 90 formed in the casting 69 opens at one end into the annular recess 84. The duct 90 opens at the opposite end into a duct 90A formed in the casting 50. The duct 90A leads into a duct 90B which in turn leads to a port 90C formed in the sleeve 55. The port 90C opens into the sleeve 55 at the high pressure side of the valve member 61. Further a port 91, Figures 4, 5, 6, and 8, formed in the casting 69 conducts atmospheric pressure into the annular recess 86.

A valve stem 92 is slidably mounted within the valve channel 82A and has provided valve members 93, 94, and 95 positioned in spaced relation to each other for controlling the flow of pressure medium to the port 88 through the valve channel 82A from the ports 87, and 89.

A helical expansion spring 96 is positioned at one end in a recess 97 formed in the end wall of the channel 83, while the opposite end of the spring 96 bears upon one end of the valve stem 92 and biases the valve stem 92 toward the left as viewed in Figure 6.

The opposite end of the valve stem 92 has positioned thereon an armature 98 which is slidably mounted within an electromagnet 99. The electromagnet 99 is surrounded by a casing 100 having provided at one end the end plates 101, and 101A and at the opposite end a plate 102, which plates are held in place by the casing 100.

The end plate 101 is suitably apertured at 103 for receiving the valve stem 92 and has provided the portion 104 projecting outwardly from the end plate 101 and positioned at the end of the valve channel 82A of the valve sleeve 82. The portion 104 is arranged to engage the valve member 93 for limiting the movement of the valve stem 92 toward the left as viewed in Figure 6 in response to the biasing force of the spring 96. The end plate 101 has further provided a portion 105 which projects into the electromagnet 99. The portion 105 has further formed therein a recess 106 for receiving a portion of the armature 98 so as to limit, as shown in Figure 5, movement of the armature 98 in response to the electromotive force of the electromagnet 99.

The casing 100 is positioned in a recess 107 formed on the casting 69. A plate 108 closes the outer end of the recess 107 and a split ring 108A positioned in an annular groove 109 formed in the inner surface of the recess 107 holds the plate 108 in position so as to lock in turn the electromagnet 99 within the recess 107.

A terminal 110 of the electromagnet 99 is grounded through the end plate 101A to the frame of the aircraft, while an electrical conductor 111 suitably insulated leads from the opposite terminal of the electromagnet 99 through a channel 112 formed in the casting 69 to a connector 113 of conventional type.

As shown in Figure 1, the connector 113 is connected through an electrical conductor in a cable 114 to a suitable control circuit whereby upon the de-icing mechanism being placed in an operative condition the circuit to the electromagnet 99 is energized from a suitable source of electrical energy, while under conditions where ice is not present or operation of the de-icing mechanism is not desired the circuit to the electromagnet 99 is opened and the electromagnet 99 de-energized.

It will be readily seen that upon energization of the electromagnet 99 actuating the valve stem 92 to the right, the valve member 94 is positioned between the port 88 and the port 89 so as to open the port 88 to the flow of pressure medium from the port 87 as shown in Figure 5.

However, upon the electromagnet being de-energized the valve stem 92 is biased to the left by the spring 96 so as to cause the valve member 94 to be positioned between the port 87 and the port 88 so as to thereby close the port 88 to the flow of pressure medium from the port 87 and open the port 88 to the atmosphere through port 91 as shown in Figure 6.

Thus when it is desired to operate the de-icer system, the electromagnet 99 may be energized causing the valve stem 92 as viewed in Figure 6 to be shifted to the right to the position shown in Figure 5 whereupon the valve member 94 will be positioned so that pressure medium within the conduit 58 under the force of the pumps 21, 22, 23, and 24 and having a greater pressure than the atmosphere will pass through the port 90C, duct 90B, duct 90A and duct 90 into annular recess 84, through port 87 to the valve channel 82A, through port 88, annular recess 85, duct 80 to the chamber 73 whereupon an increase in pressure above atmospheric pressure will be asserted upon the diaphragm 71 causing the pin 66 to be actuated so as to move the bell crank lever 63 in a clockwise direction and moving the valve member 61 so as to close the open end of the valve sleeve 55 against the pressure within the conduit 58 built up by the pressure pumps 21, 22, 23, and 24. In this connection it should be noted that the diaphragm 71 is of a considerably greater diameter than the valve opening controlled by the member 61 so as to provide a greater surface area to be affected by the pressure medium within the conduit 58. Thus the force of the pressure within the conduit 58 exerted upon the end 63B of the bell crank lever 63 through the actuating pin 66 and diaphragm 71 will exceed the force exerted upon the valve member 61 by the pressure within the conduit 58 due to the difference in the novel force transmitting means provided. Thus the valve member 61 will be actuated into a valve closing position and will be held in such position so long as the control valve 81 remains in the position indicated in Figure 5.

However, when conditions become such that operation of the de-icer system is no longer necessary or desirable, the pressure load built up within the conduit by the pumps 21, 22, 23, and 24 may be conveniently released by opening the control circuit causing the de-energization of the electromagnet 99. Upon such de-energization of the electromagnet 99 the spring 96 will bias the valve stem 92 toward the left as shown in Figure 6.

In the latter position of the valve stem 92, the valve member 94 will close the port 88 to the flow of pressure medium through the channel 82A from the port 87 and will open the port 88 to the atmosphere through port 89. Thus the pressure within the chamber 73 having a greater pressure than atmospheric pressure will be released through the duct 80 to the annular recess 85 through port 88 to the valve channel 82A, through the valve channel 82A to the port 89, through the port 89, annular recess 86 and out port 91 to atmosphere. Thus the pressure within the chamber 73 will be reduced to atmospheric pressure whereupon the greater pressure exerted within the conduit 58 acting upon the valve member 61 will force the valve member 61 to open the end of the valve sleeve 55 and cause the bell crank lever 63 to be actuated in a counter-clockwise direction, forcing the actuating pin 66 and the diaphragm 71 toward the chamber 73 against the now reduced biasing force acting on the diaphragm 76, as shown in Figure 6.

Upon movement of the valve member 94 to an open position the pressure medium within the conduit 58 will pass through the sleeve 55 to the chamber 51 and be exhausted through conduits 52 and 53 which are connected to suitable overboard or exhaust conduits.

Although only one embodiment of the invention has been illustrated and described, various changes in the form and relative arrangement of the parts, which will now appear to those skilled in the art, may be made without departing from the scope of the invention. Reference is, therefore, to be had to the appended claims for a definition of the limits of the invention.

What is claimed is:

1. In a de-icer system for an aircraft, the combination, comprising, a plurality of inflatable units mounted along airfoil surfaces of said aircraft, a conduit for conducting a pressure medium to said units for inflating the units, said conduit having an outlet to atmosphere, a valve for controlling said outlet, pressure responsive means operated by said pressure medium in such a manner as to position said valve so as to close said outlet and a second valve means operable at will for controlling the pressure medium to said pressure responsive means.

2. In a de-icer system for an aircraft, the combination, comprising, a plurality of inflatable units mounted along airfoil surfaces of said aircraft, a conduit for conducting a pressure medium to said units for inflating the units, said conduit having an outlet to atmosphere, a valve for controlling said outlet, pressure responsive means operated by said pressure medium in such a manner as to position said valve so as to close said outlet, and control means operable at the will of the operator for diverting said pressure medium from said pressure responsive means so as to cause said valve to open said outlet for releasing the pressure medium within said conduit.

3. In a de-icer system for an aircraft, the combination, comprising, a plurality of inflatable units mounted along airfoil surfaces of said aircraft, a conduit for conducting a pressure medium to said units for inflating the units, said conduit having an outlet to atmosphere, a valve for controlling said outlet and means operated by said pressure medium for positioning said valve so as to close said outlet and means operable at will for controlling the pressure medium to said pressure responsive means.

4. In a de-icer system for an aircraft, the combination, comprising, a plurality of inflatable units mounted along airfoil surfaces of said aircraft, a conduit for conducting a pressure medium to said units for inflating the units, said conduit having an outlet to atmosphere, a valve for controlling said outlet, operator-operative means adjustable in a first sense for directing said pressure medium so as to cause said valve to close said outlet and said means adjustable in a second sense for directing said pressure medium so as to cause said valve to open said outlet for releasing the pressure medium within said conduit to the atmosphere.

5. In a de-icer system for an aircraft, the combination, comprising, a plurality of inflatable units mounted along airfoil surfaces of said aircraft, a conduit for conducting a pressure medium to said inflatable units, means for controlling the outlet from said conduit to said units, a pressure pump for maintaining the pressure of said medium within said conduit, a control valve means responsive to discontinuance of operation of the units for opening the conduit to atmosphere for releasing the pressure medium within said conduit so as to thereby decrease the pressure of said medium acting upon said pump during the discontinuance of operation of said inflatable units.

6. In a de-icer system for an aircraft, the combination, comprising, a plurality of inflatable units arranged along the leading edge of the wings of the aircraft, a conduit extending spanwise of the said wings of said aircraft, a pump for maintaining a fluid medium under pressure within said conduit, a plurality of valve members for controlling the flow of said fluid medium from said conduit to said inflatable units, control valves mounted at opposite ends of said spanwise extending conduit, means responsive to discontinuance of operation of said units for operating said control valves so as to open said conduit to atmosphere for releasing the fluid medium under pressure from said conduit upon the discontinuance of operation of said inflatable units.

7. In a de-icer system of the class including a plurality of inflatable units, a pressure supply line for said units, outlet means therefor, a pressure pump for maintaining the pressure in said supply line, a plurality of distributor mechanisms for the units to connect said supply line and said outlet means in alternation with the units, there being a distributor mechanism individual to each unit and timing means common to said distributor mechanisms for controlling the operation of the distributor mechanisms of the units in alternation; the improvement comprising said supply line having an auxiliary outlet, a valve controlling said outlet, and means responsive to discontinuance of operation of said timing means for opening said valve to release the pressure within said supply line so as to prevent a back pressure from acting upon the pressure pump at such times as the de-icer system is not in operation.

SAMUEL K. LEHMAN.
MYRON L. TAYLOR.